United States Patent
van Hassel et al.

(10) Patent No.: US 10,634,398 B2
(45) Date of Patent: Apr. 28, 2020

(54) HEATING, VENTILATION, AIR CONDITIONING AND REFRIGERATION SYSTEM

(71) Applicant: Carrier Corporation, Palm Beach Gardens, FL (US)

(72) Inventors: Bart Antonie van Hassel, Weatogue, CT (US); Abdelrahman Elsherbini, Windsor, CT (US); Thomas D. Radcliff, Vernon, CT (US); Parmesh Verma, South Windsor, CT (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 90 days.

(21) Appl. No.: 16/063,512

(22) PCT Filed: Oct. 18, 2016

(86) PCT No.: PCT/US2016/057480
§ 371 (c)(1),
(2) Date: Jun. 18, 2018

(87) PCT Pub. No.: WO2017/105615
PCT Pub. Date: Jun. 22, 2017

(65) Prior Publication Data
US 2019/0003749 A1    Jan. 3, 2019

Related U.S. Application Data (60) Provisional application No. 62/269,380, filed on Dec. 18, 2015.

(51) Int. Cl.
*F25B 25/02* (2006.01)
*F25B 17/00* (2006.01)
*F24F 5/00* (2006.01)

(52) U.S. Cl.
CPC ............ *F25B 25/02* (2013.01); *F24F 5/0014* (2013.01); *F25B 17/00* (2013.01); *Y02A 30/276* (2018.01);
(Continued)

(58) Field of Classification Search
CPC .......... F25B 25/02; F25B 15/00; F25B 15/02; F25B 15/04; F25B 30/00; F25B 30/04;
(Continued)

(56) References Cited

U.S. PATENT DOCUMENTS

| 3,742,727 A | 7/1973 | Kaiser |
| 5,327,987 A | 7/1994 | Abdelmalek |

(Continued)

FOREIGN PATENT DOCUMENTS

| DE | 102009028330 A1 | 2/2011 |
| WO | 2009076637 A2 | 6/2009 |

(Continued)

OTHER PUBLICATIONS

International Search Report for International Application No. PCT/US2016/057480; International Filing Date Oct. 18, 2016; dated Dec. 21, 2016; 5 Pages.

(Continued)

*Primary Examiner* — Emmanuel E Duke
(74) *Attorney, Agent, or Firm* — Cantor Colburn LLP (57) ABSTRACT

A heating, ventilation, air conditioning and refrigeration (HVAC/R) system includes a sorption circuit including a heat absorption heat exchanger in fluid communication with a primary fluid flow source such that a primary fluid flow from is directed therethrough. The heat absorption heat exchanger is configured to exchange thermal energy between the primary fluid flow and a secondary fluid flow. A sorption heat exchanger includes a sorbent material to adsorb or absorb the primary fluid flow, generating thermal (Continued)

energy. The sorption heat exchanger is configured to transfer the generated thermal energy to a tertiary fluid flow. A heat exchange circuit is in fluid communication with the sorption circuit and includes a control valves connected to both the secondary fluid flow and the tertiary fluid flow configured to selectably direct the secondary fluid flow and/or the tertiary fluid flow to a conditioning heat exchanger or an ambient heat exchanger.

15 Claims, 7 Drawing Sheets

(52) U.S. Cl.
CPC ........... Y02A 30/277 (2018.01); Y02A 30/278 (2018.01); Y02B 30/62 (2013.01); Y02B 30/64 (2013.01)

(58) Field of Classification Search
CPC .......... F25B 49/00; F25B 49/04; F25B 17/00; F25B 17/08; F25B 17/086; F24F 5/0014; Y02B 30/62; Y02B 30/64; Y02A 30/276; Y02A 30/277; Y02A 30/278
See application file for complete search history.

(56) References Cited

U.S. PATENT DOCUMENTS

| | | | |
|---|---|---|---|
| 6,807,820 B2 | 10/2004 | Aikawa et al. | |
| 7,143,589 B2 | 12/2006 | Smith et al. | |
| 7,629,530 B2 | 12/2009 | Inaoka | |
| 8,511,111 B2 | 8/2013 | Lambert et al. | |
| 8,783,397 B2 | 7/2014 | Goenka et al. | |
| 8,978,395 B2 | 3/2015 | Creviston | |
| 9,080,796 B2 | 7/2015 | Shaikh et al. | |
| 2005/0016193 A1* | 1/2005 | Tarasinski | B60H 1/3201 62/238.3 |
| 2006/0112706 A1* | 6/2006 | Inoue | B60H 1/3201 62/238.3 |
| 2010/0236769 A1 | 9/2010 | Lyons et al. | |
| 2011/0226440 A1 | 9/2011 | Bissell et al. | |
| 2013/0192281 A1 | 8/2013 | Nam et al. | |
| 2015/0075163 A1 | 3/2015 | Frank et al. | |
| 2015/0089922 A1 | 4/2015 | Hussain et al. | |

FOREIGN PATENT DOCUMENTS

| | | |
|---|---|---|
| WO | 2009136938 A1 | 11/2009 |
| WO | 2014060761 A2 | 4/2014 |

OTHER PUBLICATIONS

Written Opinion for International Application No. PCT/US2016/057480; International Filing Date Oct. 18, 2016; dated Dec. 21, 2016; 5 Pages.

* cited by examiner

HEATING, VENTILATION, AIR CONDITIONING AND REFRIGERATION SYSTEM

CROSS REFERENCE TO RELATED APPLICATIONS

This application is a National Stage application of PCT/US2016/057480, filed Oct. 18, 2016, which claims the benefit of U.S. Provisional Application No. 62/269,380, filed Dec. 18, 2015, both of which are incorporated by reference in their entirety herein.

STATEMENT REGARDING FEDERALLY SPONSORED RESEARCH OR DEVELOPMENT

This invention was made with Government support under DE-AR0000183 awarded by the Department of Energy. The Government has certain rights in the invention.

BACKGROUND

The subject matter disclosed herein relates to heating, ventilation, air conditioning, and refrigeration (HVAC/R) systems. More specifically, the subject matter disclosed herein relates to cooling air of HVAC/R systems.

In HVAC/R systems for, for example, home or commercial applications, or for transportation vehicles or the like, an airflow is passed over a cooling coil through which a flow of refrigerant is circulated. The cooled airflow is then flowed into the cabin or other space to be cooled. Some HVAC/R systems are adsorption systems, including a refrigerant that is collected in an adsorber material, and periodically regenerated from the adsorber material. To regenerate the refrigerant, heat is applied to the adsorber to release the refrigerant therefrom, followed by compression of the released refrigerant, heat rejection, and condensation in a condenser. Suction pressure of the refrigerant during regeneration can be quite low, necessitating a refrigerant compressor with a high pressure ratio, and thus a large size. Since available space and energy available for use by a compressor are at a premium, systems that reduce size and/or energy use of the compressor would be well-received in the art.

BRIEF SUMMARY

In one embodiment, a heating, ventilation, air conditioning and refrigeration (HVAC/R) system includes a sorption circuit including a primary fluid flow source and a heat absorption heat exchanger in fluid communication with the primary fluid flow source such that a primary fluid flow from the primary fluid flow source is directed through the heat absorption heat exchanger. The heat absorption heat exchanger is configured to exchange thermal energy between the primary fluid flow and a secondary fluid flow through the heat absorption heat exchanger. The sorption circuit includes a sorption heat exchanger including a volume of sorbent material to adsorb or absorb the primary fluid flow, generating thermal energy at the sorption heat exchanger. The sorption heat exchanger is configured to transfer the generated thermal energy to a tertiary fluid flow through the sorption heat exchanger. A heat exchange circuit is in fluid communication with the sorption circuit and includes a conditioning heat exchanger, an ambient heat exchanger, and a plurality of control valves connected to both the secondary fluid flow and the tertiary fluid flow configured to selectably direct the secondary fluid flow and/or the tertiary fluid flow to the conditioning heat exchanger or the ambient heat exchanger.

Additionally or alternatively, in this or other embodiments a tertiary fluid flow compressor compresses the tertiary fluid flow before the tertiary fluid flow proceeds through the sorption heat exchanger.

Additionally or alternatively, in this or other embodiments a heat rejection heat exchanger cools the primary fluid flow, the tertiary fluid flow selectably directed through the heat rejection heat exchanger.

Additionally or alternatively, in this or other embodiments a heat source is in thermal communication with the ambient heat exchanger to further exchange thermal energy with the secondary fluid flow and/or tertiary fluid flow through the ambient heat exchanger.

Additionally or alternatively, in this or other embodiments the heat source is one of engine exhaust or a motor cooling system.

Additionally or alternatively, in this or other embodiments a subcooler is positioned along the primary fluid flow.

Additionally or alternatively, in this or other embodiments the primary fluid flow is ammonia.

Additionally or alternatively, in this or other embodiments the sorbent material is a salt.

Additionally or alternatively, in this or other embodiments the sorbent material is one of strontium chloride or barium chloride.

Additionally or alternatively, in this or other embodiments the sorbent material has an equilibrium vapor pressure with the primary fluid flow that is lower than a fluid vapor pressure of the primary fluid flow in the heat absorption heat exchanger.

Additionally or alternatively, in this or other embodiments a primary fluid compressor is in flow communication with the sorption heat exchanger to compress the primary fluid flow.

In another embodiment, a method of operating a heating, ventilation, air conditioning and refrigeration (HVAC/R) system includes urging a primary fluid flow to a heat absorption heat exchanger, exchanging thermal energy between the primary fluid flow and a secondary fluid flow at the heat absorption heat exchange and flowing the primary fluid flow from the heat absorption heat exchanger to a sorption heat exchanger including a volume of an sorbent material. Thermal energy is generated at the sorption heat exchanger by adsorption or absorption of the primary fluid flow into the sorbent material, and the generated thermal energy is transferred to a tertiary fluid flow at the sorption heat exchanger. One of the secondary fluid flow or the tertiary fluid flow is selectably directed through a conditioning heat exchanger to heat or cool a conditioning airflow, and the other of the secondary fluid flow or the tertiary fluid flow is selectably directed to an ambient heat exchanger.

Additionally or alternatively, in this or other embodiments the tertiary fluid flow is compressed prior to directing the tertiary fluid flow through the sorption heat exchanger.

Additionally or alternatively, in this or other embodiments the primary fluid flow is condensed at a heat rejection heat exchanger and the tertiary fluid flow is flowed through the condenser to exchange thermal energy with the tertiary fluid flow.

Additionally or alternatively, in this or other embodiments the primary fluid flow is subcooled before directing the primary fluid flow through the heat absorption heat exchanger.

These and other advantages and features will become more apparent from the following description taken in conjunction with the drawings.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

DETAILED DESCRIPTION

Figure 1:
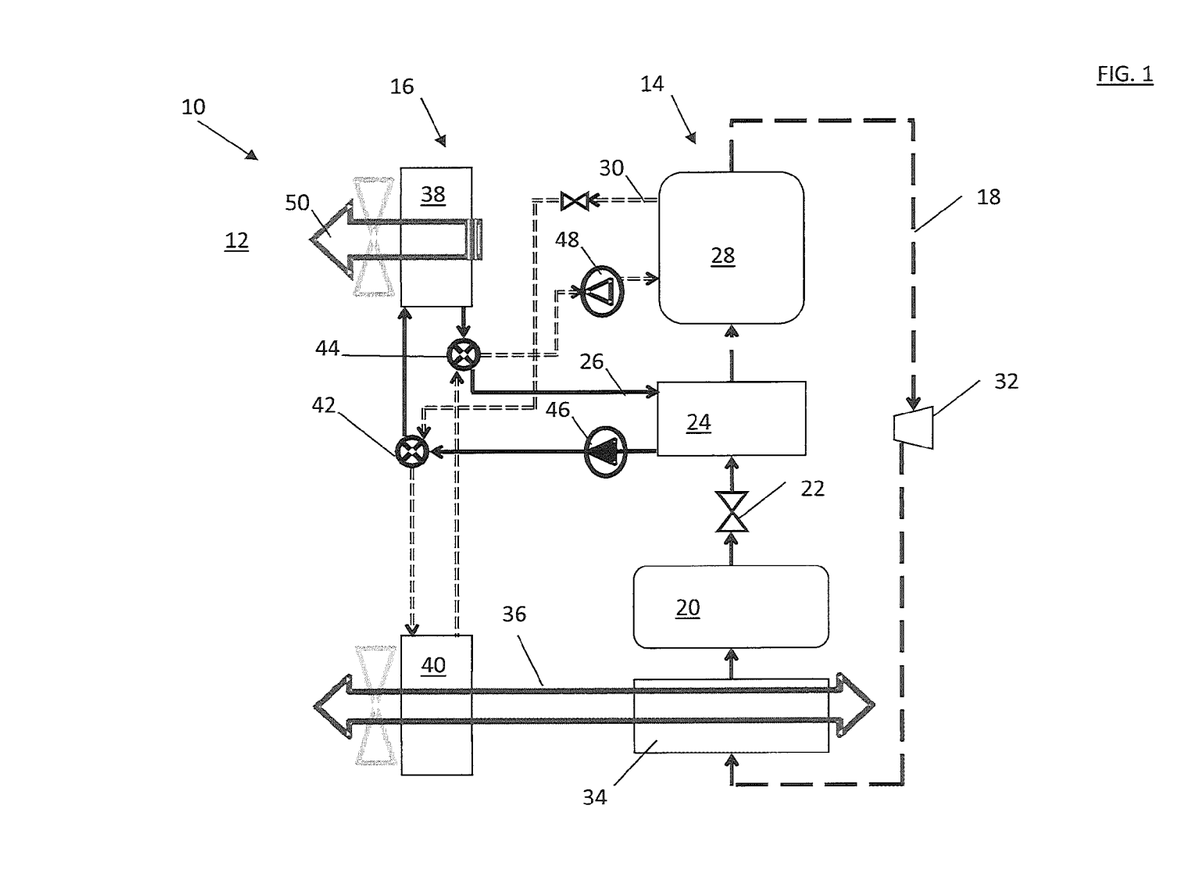
FIG. 1 is a schematic view of an embodiment of a heating, ventilation, air conditioning and refrigeration (HVAC/R) system operating in cooling mode.

Shown in FIG. 1 is a schematic view an exemplary embodiment of a heating, ventilation, air conditioning and refrigeration (HVAC/R) system 10. The HVAC/R system 10 is described in the context of a vehicle, in particular an electrically-powered vehicle, in which the HVAC/R system 10 is utilized to cool or heat a conditioned space 12, for example a vehicle passenger cabin. It is to be appreciated, however, that the system disclosed herein may be utilized in a variety of other applications such as conditioning of residential or commercial spaces, transportation refrigeration units, or refrigerated display cases.

The HVAC/R system 10 includes a sorption circuit 14 and a heat exchange circuit 16. The sorption circuit 14 circulates a primary fluid flow 18 therethrough, which in some embodiments is ammonia ($NH_3$). While in some embodiments the primary fluid flow 18 is a two-phase refrigerant such as ammonia, in other embodiments the primary fluid flow 18 may be a single-phase fluid such as water or a glycol and water mixture. The primary fluid flow 18 flows from a fluid tank 20 and through an expansion device 22 to a heat absorption heat exchanger 24, such as an evaporator. At the heat absorption heat exchanger 24, the primary fluid flow 18 absorbs thermal energy from a secondary fluid flow 26 circulated through the heat absorption heat exchanger 24, cooling the secondary fluid flow 26 and evaporating the primary refrigerant flow 18. While in some embodiments the secondary fluid flow 26 is a two-phase refrigerant, in other embodiments the secondary fluid flow 26 may be a single-phase fluid such as water or a glycol and water mixture. The primary fluid flow 18 then proceeds to a sorption heat exchanger 28 including a volume of sorbent material. In some embodiments the sorbent material is an adsorbent material such as strontium chloride or barium chloride. The sorbent material is chosen to provide a desired amount of heating during sorption, while minimizing an amount of energy that must be added to the system to regenerate the primary fluid flow 18. Further, a vapor pressure of the primary fluid flow 18 is greater than a vapor pressure of the primary fluid in equilibrium with the sorbent material so the pressure differential draws the primary fluid flow 18 through the heat absorption heat exchanger 24 and toward the sorption heat exchanger 28. While the sorption described herein in relation to the embodiments is adsorption, one skilled in the art will readily recognize that absorption may be utilized via the use of an absorbent material at the sorption heat exchanger 28.

At the sorption heat exchanger 28, the primary fluid flow 18 is adsorbed, or alternatively absorbed, by the sorbent material, generating thermal energy. The generated thermal energy is transferred to a tertiary fluid flow 30 circulated through the sorption heat exchanger 28, increasing a temperature of the tertiary fluid flow 30. While in some embodiments the tertiary fluid flow 30 is a two-phase refrigerant, in other embodiments the tertiary fluid flow 30 may be a single-phase fluid such as water or a glycol and water mixture. The primary fluid flow 18 is periodically regenerated from the sorption heat exchanger 28 to replenish the fluid tank 20. Regeneration is accomplished by adding heat to the sorption heat exchanger 28 to release the primary fluid flow 18 from the sorbent material. The primary fluid flow 18 is then compressed at a primary fluid compressor 32 and then condensed at a heat rejection heat exchanger 34. The condensed primary fluid flow 18 is then collected at the fluid tank 20. In some embodiments, the primary fluid flow 18 is condensed via thermal energy exchange with an ambient airflow 36 at the heat rejection heat exchanger 34, which in some embodiments is a condenser.

The heat exchange circuit 16 is fluidly connected to the sorption circuit 14 at the heat absorption heat exchanger 24 and at the sorption heat exchanger 28 via the secondary fluid flow 26 and the tertiary fluid flow 30, respectively. The heat exchange circuit 16 further includes a conditioning heat exchanger 38, which in some embodiments is a cabin heat exchanger, and an ambient heat exchanger 40, which are selectably connected to the secondary fluid flow 26 or tertiary fluid flow 30 via first control valve 42 and second control valve 44. In some embodiments, the secondary fluid flow 26 and tertiary fluid flow 30 are R404A or R410A or R134A or the like. It is to be appreciated, however, that other suitable fluids may be utilized. Further, the secondary fluid flow 26 and the tertiary fluid flow 30 may be the same fluid material, or in some embodiments the secondary fluid flow 26 material may be different from the tertiary fluid flow 30 material. In some embodiments, the secondary fluid may be omitted and the heat absorption heat exchanger can exchange heat directly with air.

In some embodiments, a secondary fluid pump 46 is positioned along the secondary fluid flow 26 to urge the secondary fluid flow 26 through the heat absorption heat exchanger 24. The secondary fluid pump 46 may be located downstream of the heat absorption heat exchanger 24 relative to a flow direction of the secondary fluid flow 26, as is shown in FIG. 1, or may alternatively be located upstream of the heat absorption heat exchanger 24. Similarly, a tertiary fluid pump 48 is located along the tertiary fluid flow 30 to urge the tertiary fluid flow 30 through the sorption heat exchanger 28. The tertiary fluid pump 48 may be located upstream of the sorption heat exchanger 28 relative to a flow direction of the tertiary fluid flow 30, as shown in FIG. 1, or may alternatively be located downstream of the sorption heat exchanger 28.

The HVAC/R system 10 can be operated in a cooling mode to cool the conditioned space 12, in a heating mode to warm the conditioned space 12 or in regeneration mode to regenerate the primary fluid flow 18 from the sorption heat exchanger 28. Operation of the HVAC/R system 10 in cooling mode is shown in FIG. 1. In cooling mode, secondary fluid flow 26 leaving the heat absorption heat exchanger 24 flows through the first control valve 42 and to the conditioning heat exchanger 38 to exchange thermal energy with a conditioning airflow 50 to cool the conditioning airflow 50. The secondary fluid flow 26 is returned to the heat absorption heat exchanger 24 through second control valve 44 and cooled by the primary fluid flow 18. The tertiary fluid flow 30 leaving the sorption heat exchanger 28 flows to the ambient heat exchanger 40 via the first control valve 42 where thermal energy is rejected to ambient through the ambient airflow 36 through the ambient heat exchanger 40. The tertiary fluid flow 30 is then returned to the sorption heat exchanger 28 via the second control valve 44.

Figure 2:
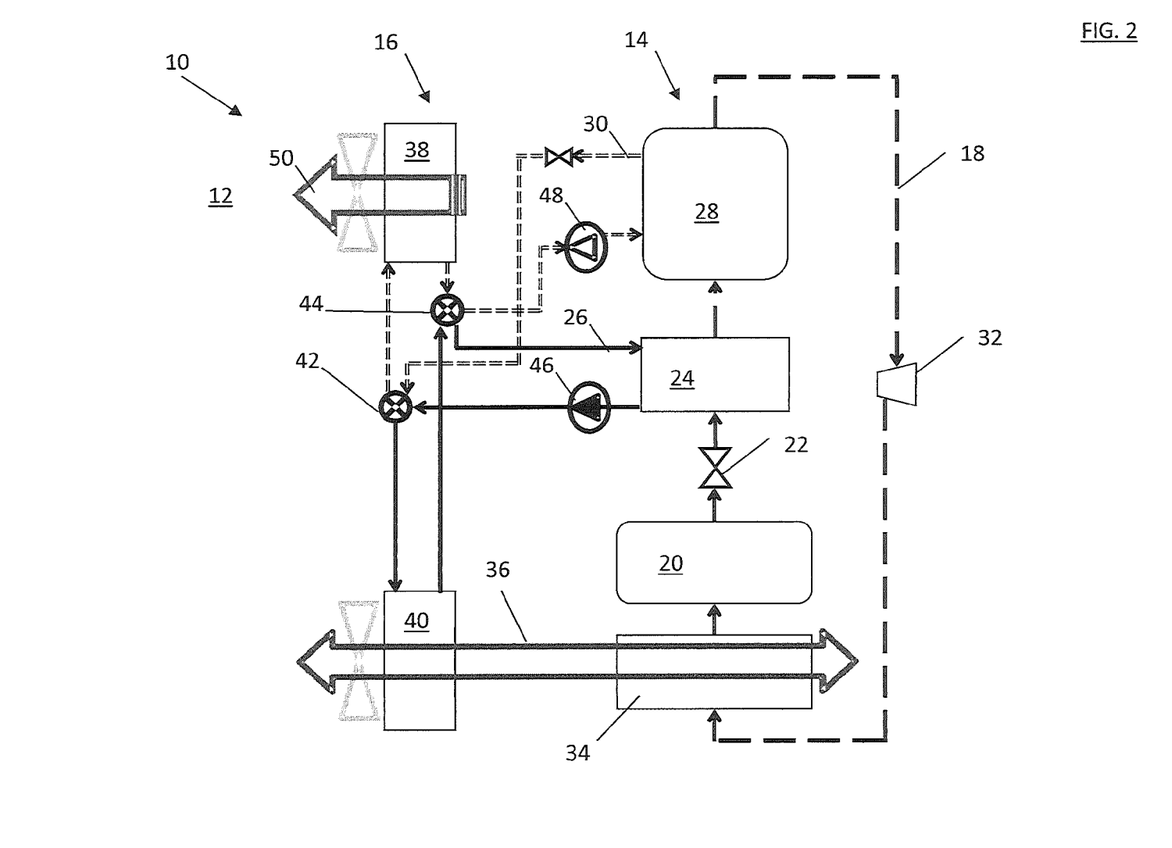
FIG. 2 is a schematic view of an embodiment of an HVAC/R system in heating mode.

FIG. 2 illustrates operation of the HVAC/R system 10 in heating mode. In heating mode, the secondary fluid flow 26 leaves the heat absorption heat exchanger 24 and is flowed through the ambient heat exchanger 40 for thermal energy exchange with the ambient airflow 36 and is routed back to the heat absorption heat exchanger 24. The tertiary fluid flow 30 is flowed from the sorption heat exchanger 28 through the conditioning heat exchanger 38 to warm the conditioning airflow 50 and is then returned to the sorption heat exchanger 28. Regeneration mode operates similar to heating mode, with ambient airflow 36 utilized to heat the sorbent material thus releasing the primary fluid flow 18 from the sorbent material. The primary fluid compressor 32 is started, to compress the primary fluid flow 18 leaving the sorption heat exchanger 28.

Figure 3:
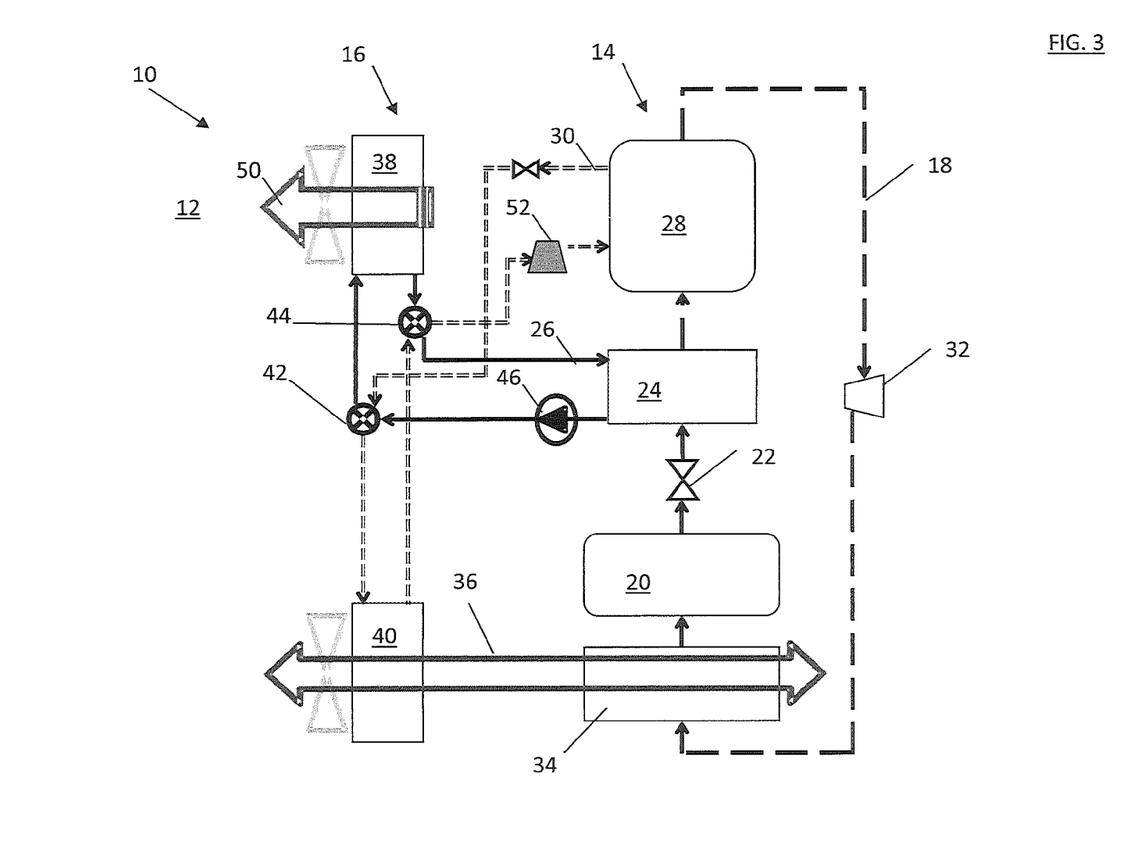
FIG. 3 is a schematic view of another embodiment of an HVAC/R system including a tertiary fluid compressor.

Another embodiment of an HVAC/R system 10 is shown in FIG. 3. In the embodiment of FIG. 3, the tertiary fluid pump 48 of the embodiments of FIGS. 1 and 2 is replaced with a tertiary fluid compressor 52. Compressing the tertiary fluid flow 30 returning to the sorption heat exchanger 28 increases the temperature of the adsorber and thereby the vapor pressure of the primary fluid flow 18 at the sorption heat exchanger 28, thus reducing a necessary pressure ratio and size of the primary fluid compressor 32 by an order of magnitude, compared to an HVAC/R system without the tertiary fluid compressor 52.

Figure 4:
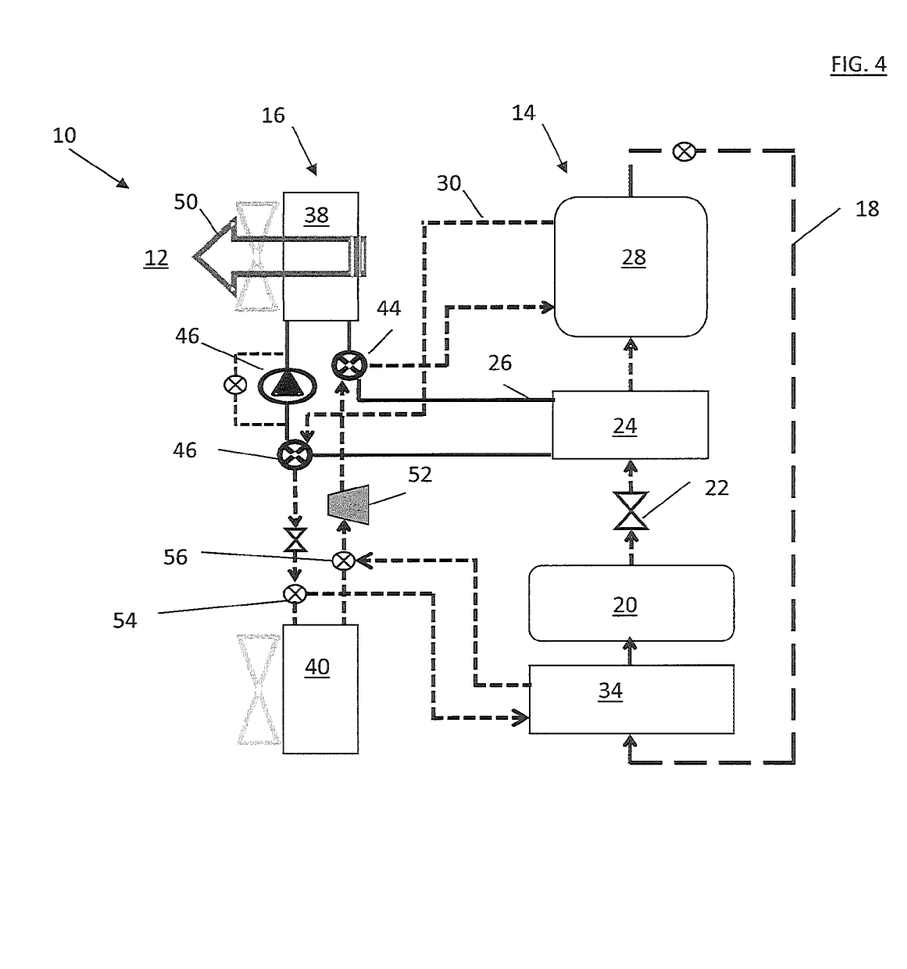
FIG. 4 is a schematic view of yet another embodiment of an HVAC/R system without a primary fluid compressor and utilizing waste heat from the primary condenser.
Figure 5:
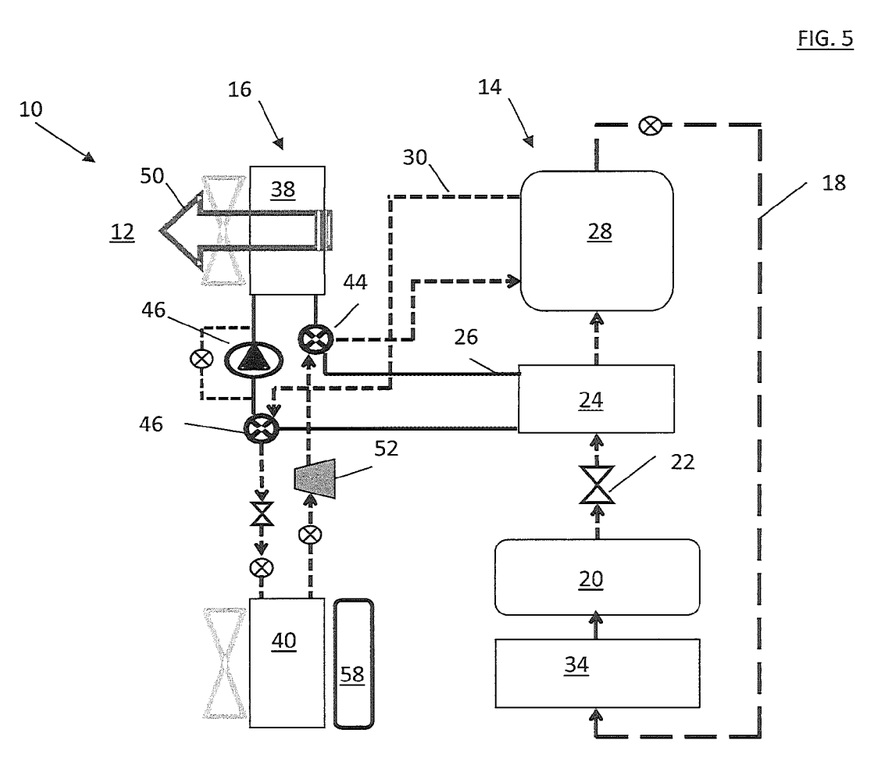
FIG. 5 is a schematic view of still another embodiment of an HVAC/R system using waste heat conditioning of a tertiary fluid flow.

FIG. 4 illustrates another embodiment of an HVAC/R system 10. In this embodiment, the tertiary fluid compressor 52 is sized such that the primary fluid compressor 32 can be eliminated. Further, the HVAC/R system 10 of FIG. 4 includes third control valve 54 and a fourth control valve 56 to allow the tertiary fluid flow 30 to be selectably directed through the ambient heat exchanger 40 or alternatively through the heat rejection heat exchanger 34 to gather waste heat from the heat rejection heat exchanger 34 for regeneration of the primary fluid flow 18 at the sorption heat exchanger 28. In another embodiment, as shown in FIG. 5, waste heat from another heat source 58 is utilized to heat the tertiary fluid flow 30 at the ambient heat exchanger 40 to provide heat needed at an elevated temperature for regeneration of the primary fluid flow 18 at the sorption heat exchanger 28. The heat acquired from the heat source 58 is sufficient to regenerate the primary fluid flow 18, without the need for a primary fluid compressor. In some embodiments, the heat source 58 is engine exhaust or coolant from a vehicle motor or battery cooling system or the like. It is to be appreciated that other heat sources 58 may be utilized.

Figure 6:
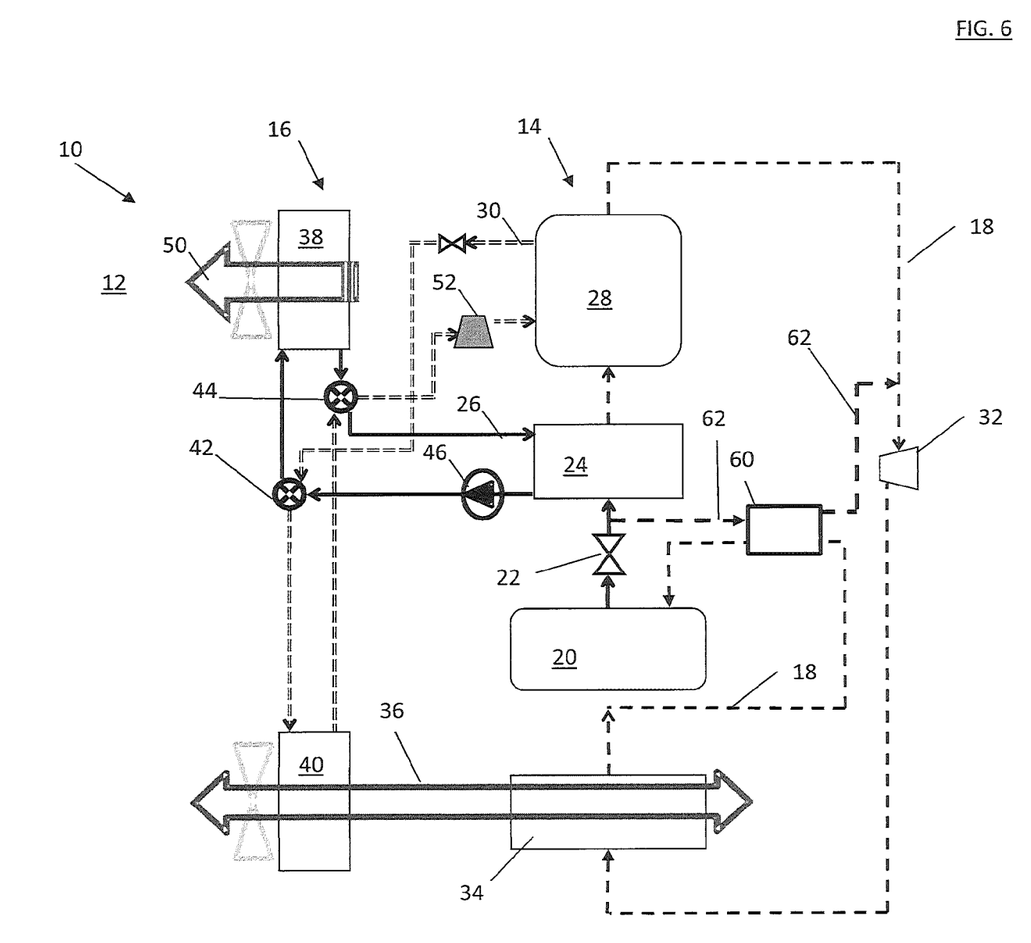
FIG. 6 is a schematic view of an embodiment of an HVAC/R system including subcooling.
Figure 7:
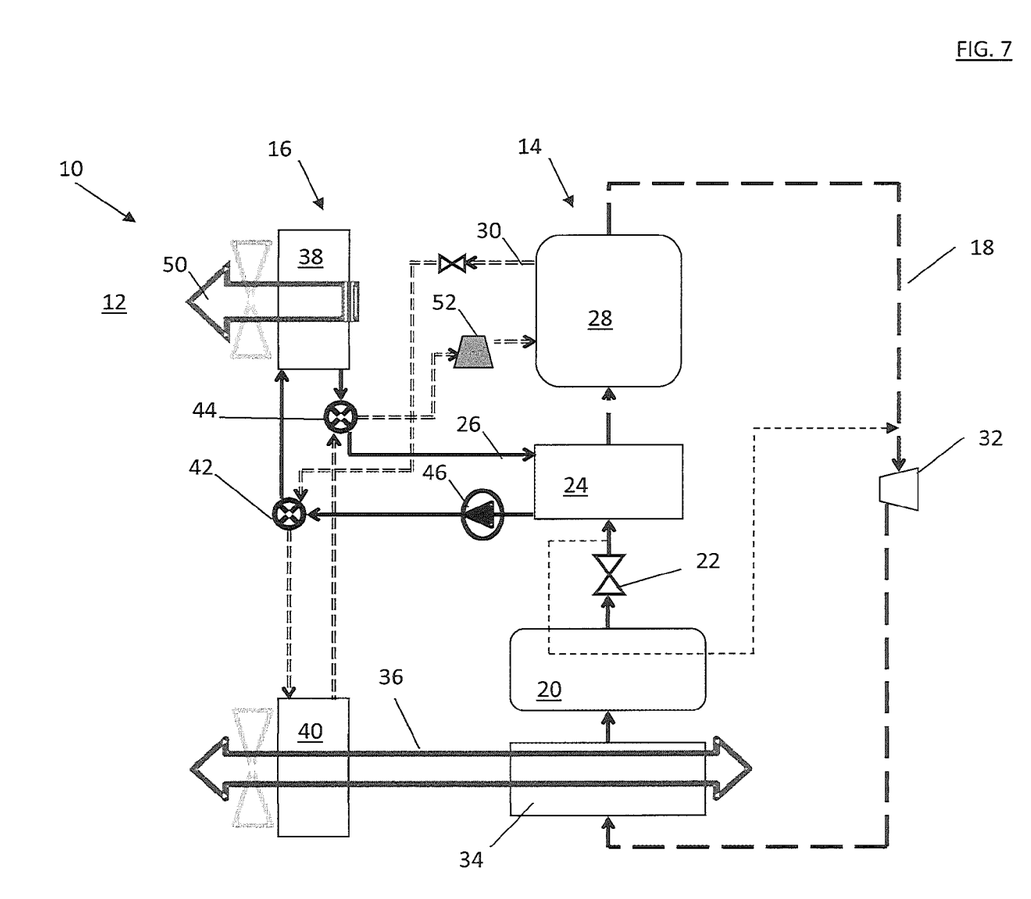
FIG. 7 is a schematic view of another embodiment of an HVAC/R system including subcooling.

In the embodiments of FIG. 6 and FIG. 7, HVAC/R system 10 performance is improved by subcooling the primary fluid flow 18 upstream of the heat absorption heat exchanger 24. Subcooling reduces a necessary charge of primary fluid flow 18 to obtain a selected amount of cooling, compared to an HVAC/R system without subcooling. Further subcooled HVAC/R system 10 with subcooling allows for reduction in size of the primary fluid compressor 32. In the embodiment of FIG. 6, the primary fluid flow 18 is condensed at the heat rejection heat exchanger 34, then directed through subcooler heat exchanger 60 before flowing to the fluid tank 20. Before flowing through the heat absorption heat exchanger 24, a subcool portion 62 of the primary fluid flow 18 is directed through the subcooler heat exchanger 60 exchanging thermal energy with the primary fluid flow 18, and through the primary fluid compressor 32.

In the embodiment of FIG. 7, the fluid tank 20 is utilized as a subcooler heat exchanger instead of utilizing a separate subcooler heat exchanger as in the embodiment of FIG. 6. The primary fluid flow 18 is flowed through the primary fluid compressor 32 and is condensed at the heat rejection heat exchanger 34 and directed into the fluid tank 20. Before reaching the heat absorption heat exchanger 24, a subcool portion 62 of the primary fluid flow 18 is directed back through the fluid tank 20 via subcool pathway 64 exchanging thermal energy with the primary fluid flow 18 in the fluid tank 20. The subcool portion 62 then is directed through the primary fluid compressor 32 for subcooling.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate in scope. Additionally, while various embodiments have been described, it is to be understood that aspects of the present disclosure may include only some of the described embodiments. Accordingly, the present disclosure is not to be seen as limited by the foregoing description, but is only limited by the scope of the appended claims.

The invention claimed is:

1. A heating, ventilation, air conditioning and refrigeration (HVAC/R) system comprising:
   a sorption circuit including:
   a primary fluid flow source;
   an heat absorption heat exchanger in fluid communication with the primary fluid flow source such that a primary fluid flow from the primary fluid flow source is directed through the heat absorption heat exchanger, the heat absorption heat exchanger configured to exchange thermal energy between the primary fluid flow and a secondary fluid flow through the heat absorption heat exchanger; and
   a sorption heat exchanger including a volume of sorbent material to adsorb or absorb the primary fluid flow, generating thermal energy at the sorption heat exchanger, the sorption heat exchanger configured to transfer the generated thermal energy to a tertiary fluid flow through the sorption heat exchanger;
   a heat exchange circuit in fluid communication with the sorption circuit including:
   a conditioning heat exchanger;
   an ambient heat exchanger; and
   a plurality of control valves connected to both the secondary fluid flow and the tertiary fluid flow configured to selectably direct the secondary fluid flow and/or the tertiary fluid flow to the conditioning heat exchanger or the ambient heat exchanger.

2. The HVAC/R system of claim 1, further comprising tertiary fluid flow compressor to compress the tertiary fluid flow before the tertiary fluid flow proceeds through the sorption heat exchanger.

3. The HVAC/R system of claim 1, further comprising a heat rejection heat exchanger to cool the primary fluid flow, the tertiary fluid flow selectably directed through the heat rejection heat exchanger.

4. The HVAC/R system of claim 1, further comprising a heat source in thermal communication with the ambient heat exchanger to further exchange thermal energy with the secondary fluid flow and/or tertiary fluid flow through the ambient heat exchanger.

5. The HVAC/R system of claim 4, wherein the heat source is one of engine exhaust or a motor cooling system.

6. The HVAC/R system of claim 1, further comprising a subcooler disposed along the primary fluid flow.

7. The HVAC/R system of claim 1, wherein the primary fluid flow comprises ammonia.

8. The HVAC/R system of claim 1, wherein the sorbent material is a salt.

9. The HVAC/R system of claim 8, wherein the sorbent material is one of strontium chloride or barium chloride.

10. The HVAC/R system of claim 1, wherein the sorbent material has an equilibrium vapor pressure with the primary fluid flow that is lower than a fluid vapor pressure of the primary fluid flow in the heat absorption heat exchanger.

11. The HVAC/R system of claim 1, further comprising a primary fluid compressor in flow communication with the sorption heat exchanger to compress the primary fluid flow.

12. A method of operating a heating, ventilation, air conditioning and refrigeration (HVAC/R) system comprising:
    urging a primary fluid flow to an heat absorption heat exchanger;
    exchanging thermal energy between the primary fluid flow and a secondary fluid flow at the heat absorption heat exchanger;
    flowing the primary fluid flow from the heat absorption heat exchanger to a sorption heat exchanger including a volume of a sorbent material;
    generating thermal energy at the sorption heat exchanger by adsorption or absorption of the primary fluid flow into the sorbent material;
    transferring the generated thermal energy to a tertiary fluid flow at the sorption heat exchanger; and
    selectably directing one of the secondary fluid flow or the tertiary fluid flow through a conditioning heat exchanger to heat or cool a conditioning airflow; and
    selectably transferring the other of the secondary fluid flow or the tertiary fluid flow to an ambient heat exchanger.

13. The method of claim 12, further comprising compressing the tertiary fluid flow prior to directing the tertiary fluid flow through the sorption heat exchanger.

14. The method of claim 12, further comprising:
    condensing the primary fluid flow at a heat rejection heat exchanger; and
    flowing the tertiary fluid flow through the condenser to exchange thermal energy with the tertiary fluid flow.

15. The method of claim 12, further comprising subcooling the primary fluid flow before directing the primary fluid flow through the heat absorption heat exchanger.

* * * * *